May 1, 1951 W. G. HORTON 2,551,539
DISPLAY HOLDER
Filed Nov. 5, 1947
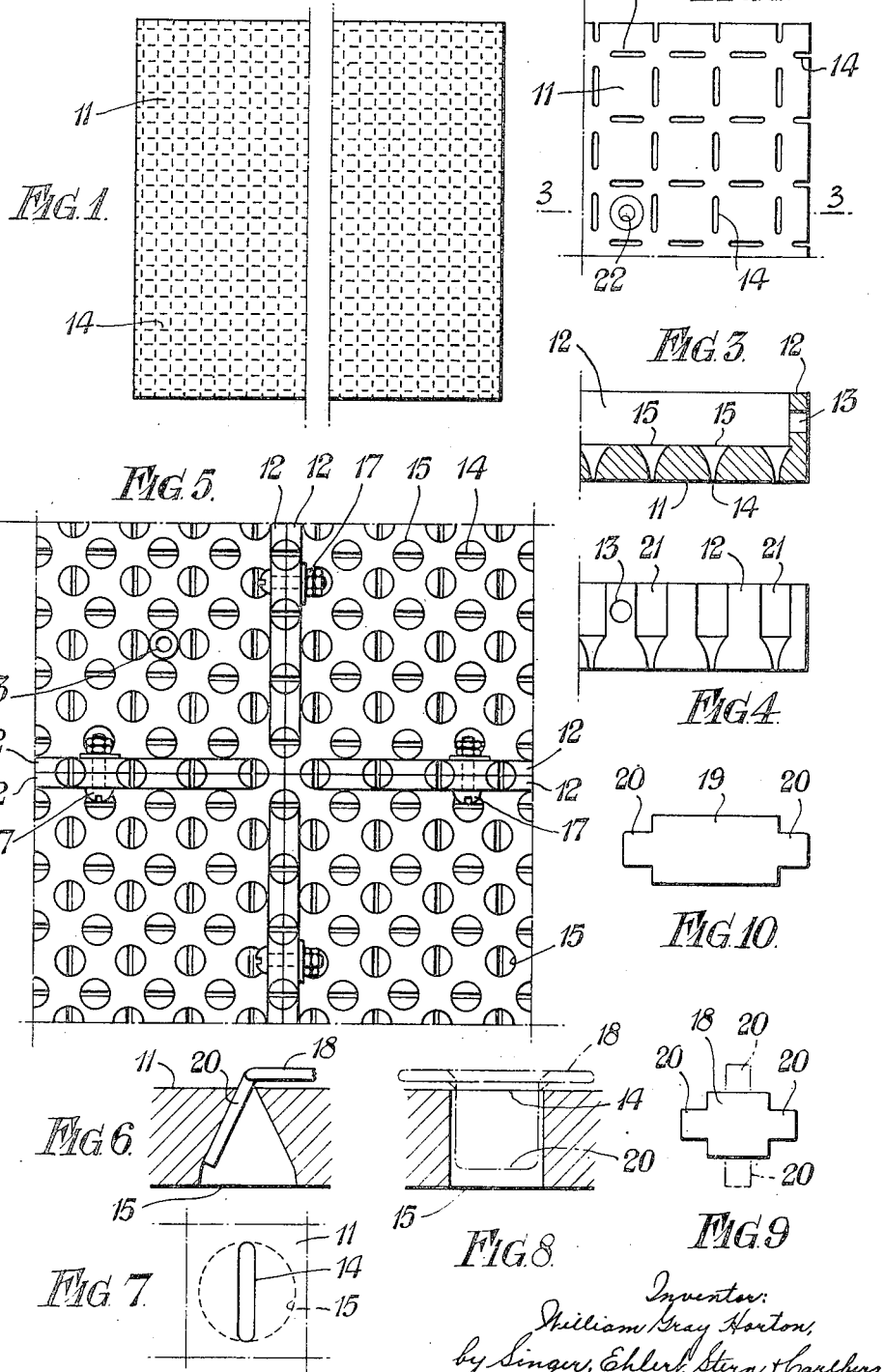
Inventor:
William Gray Horton,
by Singer, Ehlert, Stern & Carlberg
Attorneys.

Patented May 1, 1951

2,551,539

UNITED STATES PATENT OFFICE 2,551,539

DISPLAY HOLDER

William Gray Horton, London, England

Application November 5, 1947, Serial No. 784,274
In Great Britain October 22, 1946

Section 1, Public Law 690, August 8, 1946
Patent expires October 22, 1966

3 Claims. (Cl. 40—63)

This invention relates to indicating devices which include a plate of suitable material and thickness slotted with spaced "vertical" and "horizontal" slots to receive the engaging tongue portions of sheet Celluloid or other indicating "insertions" to retain such insertions on the surface of the plate, and has for its object so to form such plates that they can receive such insertions without difficulty and so that any desired number of plates can be attached together or otherwise held juxtaposed to build up an uninterrupted insertion-receiving surface of required dimensions, the structure being such that every slot is usable and of such nature that there is sufficient space at the rear of each slot for the unhindered entry and retention of the engaging tongue part of an insertion.

In general, in accordance with one feature of the invention, each plate is made of such thickness that each slot (preferably rectilinear and narrow) extends downwards therethrough from the outer surface for a fraction (preferably a small fraction) of the total thickness and leads to an enlarged space in the remaining portion of the thickness.

For this purpose the plate is of requisite thickness and suitable material, for example it is moulded or otherwise made from thermo-setting or thermo-plastic material whereby on the outer surface the slots may be given their narrow rectilinear form with suitably shaped, for example rounded, ends and extend about one-third through the thickness, and on the rear, for about the other two thirds of the thickness, may start as circular apertures merging into the slots hereinbefore referred to; in other words, the circular apertures at the rear join and communicate with the rectilinear slots in a somewhat tapered manner.

In one particular method of carrying the invention into effect, the single thickness of the plate is of thermo-setting or thermo-plastic material which is moulded to form the plate, the thickness being about a quarter of an inch or more. At the rear, in each position for a slot, a slightly tapered cylindrical recess is moulded which merges and contracts into the rectlinear diametric slot proper which opens out on the front surface. This rectlinear slot is of desired width and, as before stated, diametrically arranged in relation to the rear circle. Each slot in the example dealt with is about a quarter of an inch long and the slots are arranged in horizontal and vertical lines so that (on the surface of the plate) they form partial boundaries to squares of an imaginary side of half an inch.

As already explained, passing from the outer slotted surface to the rear surface the hollow space gradually expands from the diametric slot outline to a circular slot outline. Consequently, in moulding, the lower moulding plate with the male counterpart of the hollow space by its tapered formation readily can be withdrawn.

It is preferred that the junctions between the plates, that is to say, what may be termed the "breaks," come at the half positions of the slots at right angles to the edge of the break. In this manner, when two such members are juxtaposed the edge of one comprising a plurality of such right-angled half slots joins with a similar edge of the other, thus to complete the line of slots and give continuity to the built-up slotted surface.

Any suitable means may be provided for holding one plate in the correct position adjacent another plate. For example, each plate may have in desired positions countersunk holes for screws, so that the heads of the screws come flush with the outer surface while the threaded part passes through the plate (and if desired a boss at the rear) into a suitable supporting surface such as a wall. Thus, by arranging the plates side by side and one above the other in the manner of "tiles," they can be screwed to the wall or the like to give a reception surface for the insertions of desired shape and area. In other cases, any suitable means may be provided for joining adjacent plates but preferably they are provided with downwardly extending flanges suitably slotted for the engagement of clamping bolts and nuts.

In order that the invention may be better understood, it will now be described with reference to the accompanying drawings, which are given by way of example only and in which:

Fig. 1 shows a plate to a small scale, made according to the invention,

Fig. 2 shows an enlarged view of one corner of the said plate,

Fig. 3 a sectional plan on the line 3—3, Fig. 2,

Fig. 4 a plan of Fig. 2,

Fig. 5 a rear view of the junction of four plates as made in accordance with Figs. 1 to 4, Fig. 6 is an enlarged sectional view of one of the apertures through a plate, Fig. 7 a plan of Fig. 6, Fig. 8 a sectional elevation at right angles to Fig. 6 through the aperture, and Figs. 9 and 10 two forms of insertion for use with the plate.

In the method of carrying the invention into effect shown in the drawings, the plate 11 is of thermo-setting or thermo-plastic material of a single thickness of about a quarter of an inch and of desired area. It is bounded on the whole of its edges or two parallel edges by a rearwardly extending flange 12 which need not extend to the actual corners and which flange 12 is provided with slots or bolt holes 13 in desired positions so that two adjacent plates can be attached together.

Through the plates, in uniform positions partly defining the sides of regular squares, are slots 14 which in the outer surface are rectilinear and narrow and which extend downwards and enlarge into circular openings 15 which come on the underside of the plate. The method of enlargement will be appreciated from Figs. 6 and 7. That is to say, from the edges of the rectilinear slot the surfaces diverge whilst the extremities of the slot pass straight downwards.

Each slot in the example dealt with is about a quarter of an inch long and the slots are arranged, as before stated, in horizontal and vertical lines so that on the outer surface of the plate they form partial boundaries to squares of an imaginary side of half an inch. It will be realised that passing from the outer slotted surface to the rear surface the hollow space gradually expands from the diametric slot 14 to the circle 15 and thus, in moulding, the lower moulding die or plate with the male counterpart for the hollow space by its tapered formation readily can be withdrawn.

As will be appreciated from the drawings, the edges of the plates come in the half positions of the slots at right angles to the edge of the "break." Such half slots will be seen particularly in Fig. 2. In this manner, when two plates 11 are juxtaposed the half slots of one plate coincide with the half slots of the other plate, thus to complete the line of slots and give continuity to the built-up slotted surface.

The means for joining the adjacent plates together are indicated in Fig. 5 in dotted lines, 17 being nuts and bolts for this purpose.

In use it will be appreciated that the insertions such as 18 and 19, Figs. 9 and 10, which may be of sheet Celluloid of various colours, can be located in any position on a plate by means of the integral tongues 20. The sizes of the insertions and the tongues are such that an ordinary insertion bridges the space between two parallel slots whilst the tongues can readily be inserted into these slots. The enlarged space below the slots acts to accommodate the tongues, as indicated in Fig. 6, and to hold the insertions in position. In some cases an insertion may have four tongues to engage in four slots, although tongues on two parallel sides normally are sufficient. The insertions can be of a size to be accommodated between two contiguous parallel slots, but in some cases can be longer. For example, Fig. 10 shows one which is suitable to cover two squares on the plate. Of course, in some cases such insertions may be longer and broader and provided with any requisite number of tongues.

As will be seen from Fig. 4, for facilitating moulding and the joining of adjacent plates, the half slots coming at the edge expand in the usual manner (in this case into a semi-circle) and the flange takes on the hollow semi-cylindrical formation 21 thus formed. However, this does not hinder the functioning of the flange. Fig. 4, as will be seen, shows the flange 12 extending right to the corner but Fig. 5 shows the flanges stopping short of the corner.

Plates or the like in accordance with the invention and for instance such as those shown in the drawing, may be held in position by any suitable means. For example, each plate may have a number of suitably positioned countersunk apertures such as 22 (Fig. 2) therein to receive the head of a screw flush with the outer surface, the screwed shank passing through the plate to engage in a wall or otherwise. Thus, by the employment of the desired number of screws, the plate can be held fixed in position. If desired, on the underside the aperture 22 may open into a boss 23 such as indicated in Fig. 5.

In some cases, even, the employment of the countersunk or other apertures for screws to hold the plates in position on the wall may obviate the necessity for the use of apertured or other flanges for holding adjacent plates in correct relationship. In this case the screws not only act to hold the plates to the wall or the like, but also to hold plates in correct position one in relation to the next, either laterally, above or below.

The invention is not limited to the precise forms or details of construction herein described, as these may be varied to suit particular requirements.

What I claim and desire to secure by Letters Patent of the United States of America is:

1. A display or like device comprising a perforated plate having a plurality of intercepting parallel spaced rows of perforations such perforations defining substantially the form of a parallelogram each perforation increasing in area through the thickness of the plate, each perforation being formed as a slit in the outer surface of the plate which opens out towards the rear surface of the plate to provide an enlarged space, removable indicating members having retaining tongues which seat in said perforations the ends of the retaining tongues passing through the slits and into the enlarged spaces so that each tongue is free to expand into engagement with the walls of the enlarged space and be readily accessible from the rear of the plate.

2. A display or like device according to claim 1, wherein the walls of each enlarged space converge towards the outer surface of the plate to form on such outer surface a narrow slit.

3. A display or like device comprising a perforated sheet the outer surface of which is formed with a plurality of intercepting parallel spaced rows of perforations such perforations defining substantially the form of a parallelogram the walls of each slit diverging towards the rear of the plate to form an enlarged space of circular cross section behind each said slit, each slit being positioned diametrically of its associated enlarged space, and removable indicating members having retaining tongues which seat in said perforations the ends of the retaining tongues passing through the slits and into the circular spaces.

WILLIAM GRAY HORTON.

REFERENCES CITED

The following references are of record in the file of this patent:

UNITED STATES PATENTS

| Number | Name | Date |
|---|---|---|
| 1,058,739 | Fetscher | Apr. 15, 1913 |
| 1,541,655 | Parris | June 9, 1925 |
| 1,708,394 | Mugler | Apr. 9, 1929 |
| 2,111,780 | Horton | Mar. 22, 1938 |